C. N. Petersen.
Piston-Rod Packing.
No. 3,397. Reissued Apr. 20, 1869.
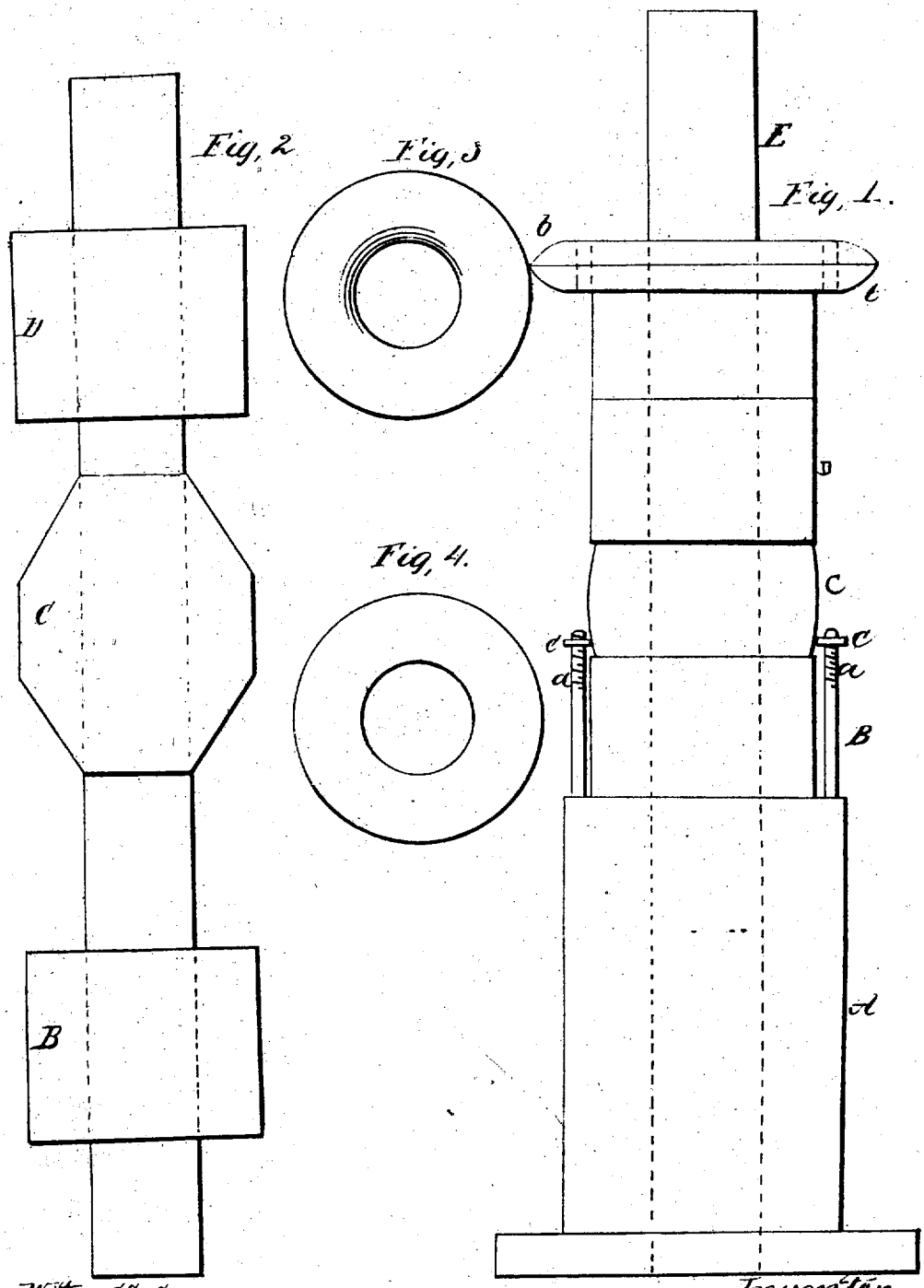
Witnesses
E. J. Gale
E. A. Grant
Inventor,
Chas. N. Petersen
for his attorney
D. Lee United States Patent Office.

CHARLES N. PETERSEN, OF CHICAGO, ILLINOIS.

*Letters Patent No.* 86,316, *dated January* 26, 1869; *reissue No.* 3,397, *dated April* 20, 1869.

IMPROVEMENT IN WOODEN PACKING FOR PISTON-RODS AND OTHER ENGINERY.

The Schedule referred to in these Letters Patent and making part of the same.

Be it known that I, CHARLES N. PETERSEN, of Chicago, in the county of Cook, and State of Illinois, have invented certain new and useful Devices in Wood-Packing for the Piston-Rods of Steam-Engines; and I hereby declare that the following is a full and sufficient description thereof, reference being had to the accompanying drawings, and references thereon, in which—

Figure 1 is a vertical elevation of the packing and apparatus.

Figure 2 is a perspective view of the same.

Figure 3 is an end view of the concave part of D, or of B.

Figure 4 is an end view of the plane face of B or D.

That others skilled in the art may make and use my invention, I proceed to describe it.

Suitable timber having been selected, it is turned to fit the size of the stuffing-box, and bored out to receive the piston-rod. It is divided into three sections, B, C, and D.

Fig. 1. B and D are of the same form. The outer ends have plane faces, at right angles with the axis of the cylinder.

Fig. 4. The inner ends are conical and concave, as seen in the concave end, fig. 3, to receive the two ends of the middle section, C, and these three pieces constitute the packing.

The packing is bored very accurately to fit the piston-rod or its equivalent, and both are pushed into the stuffing-box, where they are held in place by cap *b b*, screw-bolt *a a*, and nuts *c c*, and piston-rod E plays through the packing easily when dry, but steam-tight when filled with steam.

The wood-packing is specially adapted to piston-rods and valve-stems, and parts of similar construction.

The preparation of the wood, in substance, in the early part of my experiments, was made by boiling the timber in water, which acted to swell the wood, without dissolving out the incrusting-matter on the fibres of the wood-pores, and did not impart elasticity to the wood, so necessary to a good packing.

The next step was to put the packing into an iron cylinder, which it exactly filled, and force high steam through its pores, which at length dissolved out the incrusting-matter, and left the wood in a soft and elastic state.

The next step in the improvement was to substitute the stuffing-box itself for the iron cylinder, and the cap and bolts of the stuffing-box being loosened, to allow free access of steam to the end of the cylinder, the steam is let on, and passed through the stuffing-box and packings, till the packings become soft and elastic, and adapted to the very mould where they are to be used.

The cap and bolts of the stuffing-box are now screwed down in their places.

This third step in the improvement makes one step in the improvement over that of using the iron cylinder, in that once fitting the packing to the cylindric space, serves the purpose of both the iron cylinder and stuffing-box.

The construction of the inner ends of B and D is such as to receive the double cone-piece C, which three pieces, pressed together at their ends, constitute a tight packing, which requires but little attention to keep in order, and will last from one to two years.

The working of this packing forms a glaze on the surface, from a mixture of the lubricating-oil and the incrusting-matter of the wood, which greatly increases its durability.

The elastic character of this packing renders clamping the piston-rod, so necessary in other kinds of piston-packings, to keep packings in place, scarcely ever necessary here.

The cost of this packing, in a one hundred and twenty horse-power engine, is about three dollars, while a packing of hemp, metal, or soapstone, is twenty-three dollars, and must be renewed three times while packing of wood needs to be renewed once.

The blocks constituting the three sections of packing, for easy removal, are cut longitudinally and radially, through the plane of the cylinder, into ten pieces, so that each piece can be removed separately, and replaced without disturbing the machinery.

The advantages of this packing over others in use, are—

First. That it costs three dollars for a one hundred and twenty horse-power engine, while others cost twenty-three dollars.

Second. This packing will last from one to two years, while other kinds will last only one-third as long.

Third. The friction of wood is much less than that of other packings, from the fact that the absorptive surface of the wood absorbs and holds the lubricating-oil, and mingling with the incrusting-matter, forms a glaze on its surface, which is lasting, and requires less than half the lubricating used in other packings.

Having stated the nature of the invention, and the mode of using the same,

What I claim as my invention, and desire to secure by Letters Patent, is—

The construction and arrangement of the double conic wooden packing, substantially in the manner herein set forth.

CHARLES N. PETERSEN.

Witnesses:

WILLIAM TURTLE,
JAMES H. SMITH.